April 2, 1963 K. BAUM 3,084,039
RECOVERY OF COMBUSTIBLE GASES IN
FERRO-METALLURGICAL PROCESSES
Filed Jan. 12, 1959 2 Sheets-Sheet 1
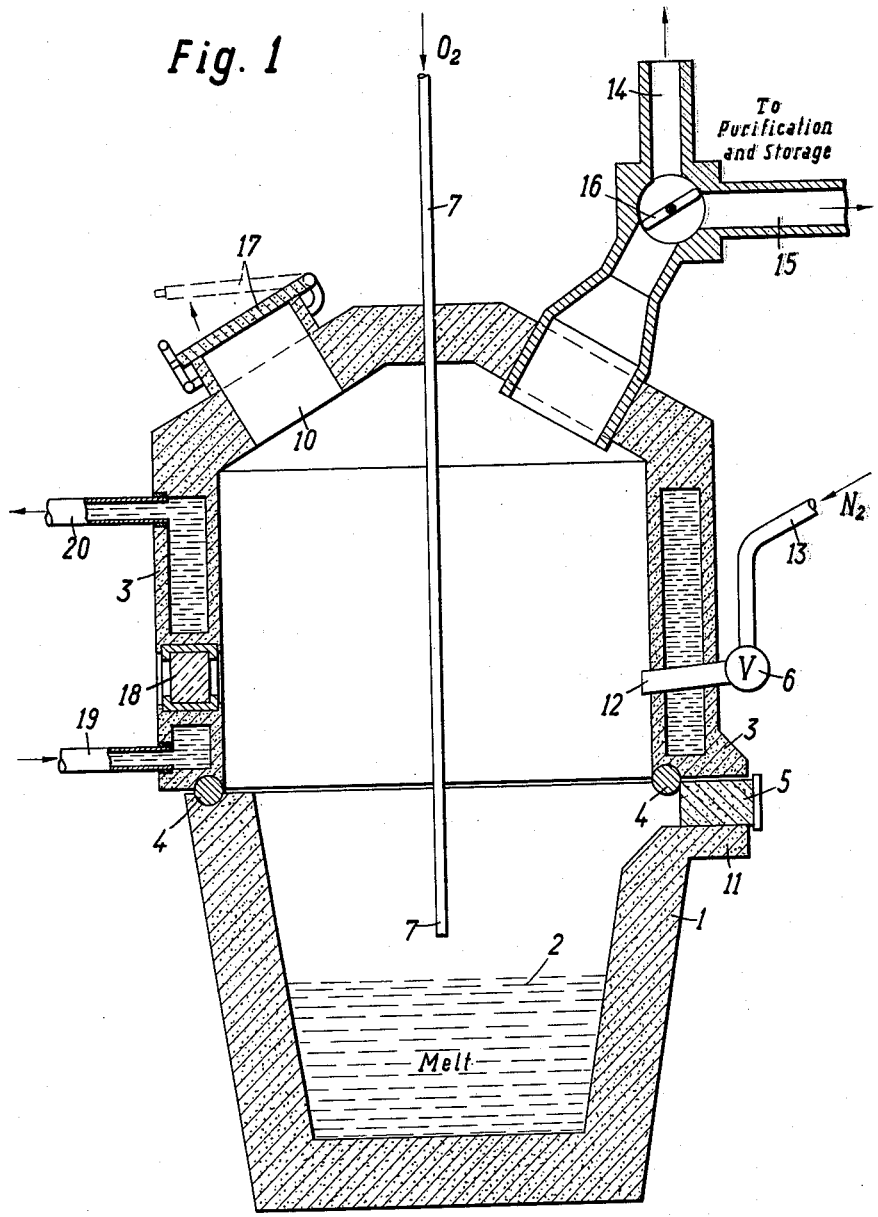
Inventor:
Kurt Baum
By [signature]
Agent

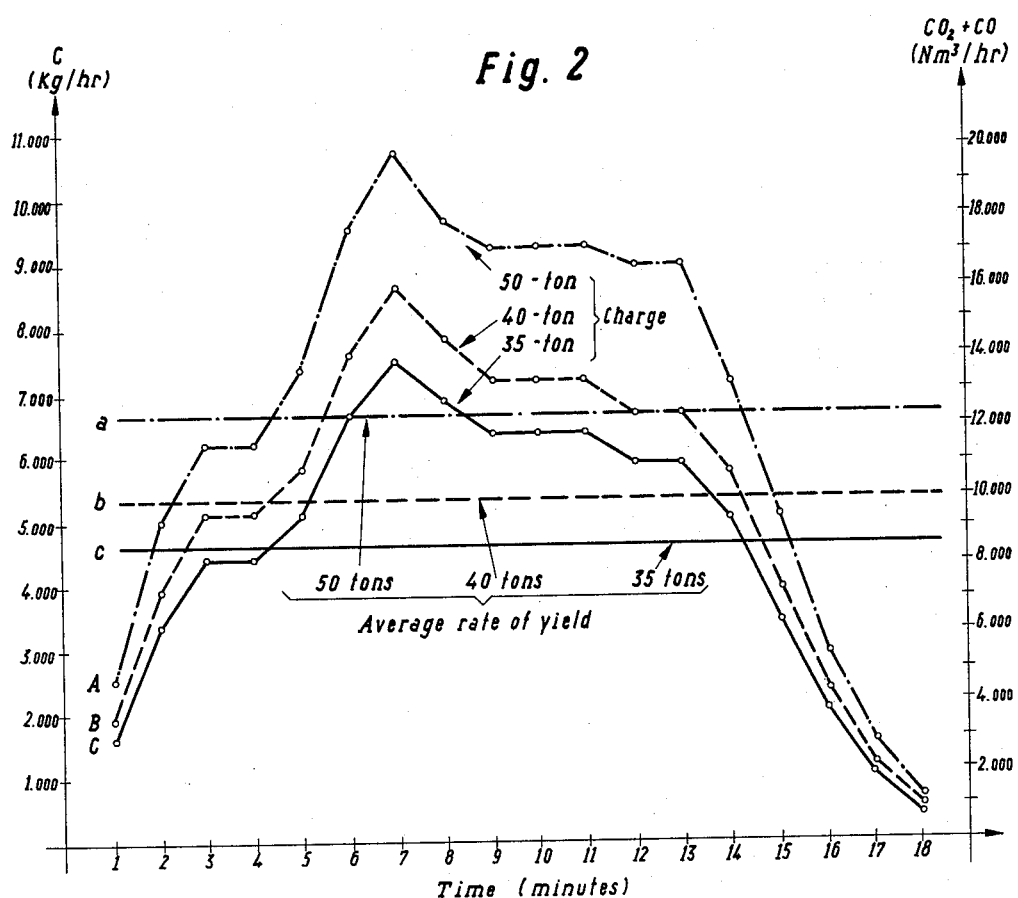

United States Patent Office 3,084,039
Patented Apr. 2, 1963

3,084,039
RECOVERY OF COMBUSTIBLE GASES IN FERRO-METALLURGICAL PROCESSES
Kurt Baum, Essen, Germany, assignor, by mesne assignments, to Henry J. Kaiser Company, Oakland, Calif., a corporation of Nevada
Filed Jan. 12, 1959, Ser. No. 786,435
6 Claims. (Cl. 75—59)

My present invention relates to metallurgical processes in which a ferrous metal, such as pig iron, is refined in a converter by being contacted at high temperatures with an oxygen-containing gas stream.

The reaction of the oxygen with the carbon extracted from the molten ferrous mass gives rise to waste gases which are rich in carbon monoxide while also containing a considerably smaller proportion of carbon dioxide, these gases being therefore highly combustible so as to be adapted for use as a fuel. The recovery of these gases has, however, heretofore been extremely difficult on account of their high temperatures which complicate the task of delivering them to a consumer, such as a burner, or to a storage tank. Moreover, these gases often entrain solid particles from the slag and the melt of the converter, particularly if the latter operates with an air blast passing through the bath, respectively red oxide fumes, if pure oxygen blast is applied, and can be purified only with difficulty because of their high temperatures. Attempts to cool the gases in the converter itself by means of a heat exchanger, designed to abstract the sensible heat of these gases for useful purposes, have been only moderately successful.

The general object of the present invention is to provide a process and an apparatus for simplifying and rendering more economical the recovery of combustible converter gases by lowering and suitably controlling the temperature of these gases before they leave the converter.

The invention realizes this object by the admission of a cool, inert gas (e.g. nitrogen) into the hot gases from the converter during the refining process, advantageously at a location considerably above the bath level, in such manner that the hot reaction gases mix with the inert gas and are cooled by it on their way to a discharge duct.

Whereas in some prior systems the gases are discharged from the converter after the air has been cut off, in an attempt to reduce the temperature of the gases, I have found that with my improved process I may withdraw the reaction gases continuously during the blow. In order to minimize the entrainment of solids by the gases, I prefer to direct the oxygen stream onto the bath surface (i.e. top blowing) at a location between the melt and the inlet for the inert gas so that the refining operations proper may proceed at the usual high temperatures. I have found that, in this manner, the maximum gas temperature may be reduced to well below 1,000° C. without interfering with the metallurgical processes.

A suitable apparatus for carrying out the process of the invention comprises a hood adapted to be placed in an air-tight manner over the converter mouth, this hood having an inlet for the admission of nitrogen or other inert gas, an outlet for the gas mixture to be recovered, and a feeder pipe extending downwardly into the converter for supplying free oxygen to the bath. The hood advantageously has water-cooled walls and may be provided with one or more sight glasses, for observation purposes, and with a closable port for the addition of fluxes or the like to the melt.

The invention will be described in greater detail with reference to the accompanying drawing in which:

FIG. 1 is a somewhat diagrammatic view, in sectional elevation, of a converter provided with a hood according to the invention; and FIG. 2 is a set of graphs illustrating the carbon and gas yield of a converter as shown in FIG. 1.

The apparatus shown in FIG. 1 comprises a converter 1, made of the usual refractory material, and a water-jacketed hood 3 removably supported on the converter. The latter, filled with a ferrous melt to a level 2, has the usual spout 11 for the removal of the charge when the converter is tilted; during the refining operation, this spout is closed in an air-tight manner by a plug 5 which, together with a packing strip 4 of any suitable sealing material, prevents the escape of gases between the converter and the hood.

The hood 3 is provided with an inlet port 12 at which terminates a conduit 13 for the admission of an inert cooling gas, such as nitrogen, of approximately room temperature; the flow of this gas is controlled by a valve 6. Oxygen is admitted into the converter 1 through a tube 7 which centrally depends from the top of the hood and terminates a short distance above the level 2 of the melt. An outlet 8 for the converter gases, provided at the top of hood 3 above inlet 12, opens into a flue 14 from which a duct 15 leads to a purification device, such as a venturi washer, and a storage tank not further illustrated. A damper 16 in flue 14 enables these gases to be selectively discharged into the atmosphere or delivered to the storage tank. A vent 10, normally closed by a lid 17, facilitates the introduction of fluxes into the bath; one or more sight glasses 18 are provided at suitable locations in the hood 3. The inlet and outlet tubes for the circulation of cooling water through the walls of the hood are shown at 19 and 20.

The temperature of the inert gas admitted at inlet 12 advantageously lies in the neighborhood of 20° C. In a specific example, in which nitrogen was so admitted at a gauge pressure of 40 mm. of water to produce a gauge pressure of about 1 mm. of water within the hood, the rate of flow was 35,000 Nm.$^3$/hr. (cubic meters per hour, reduced to atmospheric normal) during the first two minutes of operation and 20,000 Nm.$^3$/hr. thereafter, the increased initial rate of flow serving to scavenge the mixing chamber within the hood so as to remove any explosive gas mixture therefrom. The following table lists the temperatures of the reaction gases and of the mixture, the rate of nitrogen admission, the carbon yield, and the amounts of carbon dioxide and carbon monoxide recovered from the converter, the overall discharge rate being readily computable as the sum of the values given in the three columns III, IV and VI.

At such discharge rate a nearly uniform flow of effluent gases with fluctuations not exceeding ±20 vol. percent in max. at an off-gas temperature of 700° C. ±50° C. is obtained—a most important supposition for efficient gas cleaning by a venturi-scrubber, preferably, to be used as best suitable and proved method for this purpose.

| I<br>Time (Minutes) | II<br>Carbon Yield (kg./hr.) | III<br>$CO_2$ Output (Nm.³/hr.) | IV<br>CO Output (Nm.³/hr.) | V<br>Converter-Gas Temperature (°/C.) | VI<br>$N^2$ Input (Nm.³/hr.) | VII<br>Gas-Mixture Temperature (° C.) |
|---|---|---|---|---|---|---|
| 1 | 2,500 | 233 | 4,417 | 1,750 | 35,000 | 600 |
| 2 | 5,000 | 465 | 8,835 | 1,750 | 35,000 | 600 |
| 3 | 6,200 | 575 | 10,925 | 1,750 | 20,000 | 700 |
| 4 | 6,200 | 575 | 10,925 | 1,750 | 20,000 | 700 |
| 5 | 7,300 | 675 | 12,875 | 1,750 | 20,000 | 700 |
| 6 | 9,500 | 883 | 16,767 | 1,750 | 20,000 | 750 |
| 7 | 10,700 | 995 | 18,905 | 1,750 | 20,000 | 800 |
| 8 | 9,600 | 893 | 16,957 | 1,750 | 20,000 | 750 |
| 9 | 9,200 | 855 | 16,145 | 1,750 | 20,000 | 750 |
| 10 | 9,200 | 855 | 16,145 | 1,750 | 20,000 | 750 |
| 11 | 9,200 | 855 | 16,145 | 1,750 | 20,000 | 700 |
| 12 | 8,900 | 828 | 15,722 | 1,750 | 20,000 | 700 |
| 13 | 8,900 | 828 | 15,722 | 1,750 | 20,000 | 700 |
| 14 | 7,100 | 660 | 12,540 | 1,750 | 20,000 | 650 |
| 15 | 5,000 | 465 | 8,835 | 1,750 | 20,000 | 600 |
| 16 | 2,900 | 270 | 5,130 | 1,750 | 25,000 | 600 |
| 17 | 1,500 | 140 | 2,660 | 1,750 | 25,000 | 600 |
| 18 | 700 | 65 | 1,235 | 1,750 | 25,000 | 600 |

The above table relates to a converter charged with 50 tons of pig iron. It will be noted that the CO content of the recovered gas rises appreciably during the first two minutes and drops sharply after 15 minutes of $O_2$-blowing operation, the gases being therefore preferably directed into the atmosphere during the first two and the last three minutes of operation; at the latter stage an increase in the rate of cooling-gas admission, in order to flush the mixing chamber, will be desirable and has been indicated in the table.

For purposes of comparison, I have shown in FIG. 2 three graphs A, B, C of which the first one, A, represents the yield in carbon and in $CO_2+CO$ for a 50-ton charge, in accordance with the values listed in columns II, III and IV of the foregoing table, the graphs B and C giving the corresponding values for charges of 40 and 35 tons respectively. At a, b and c I have indicated the average rate of yield for the three charges referred to. The ratio of carbon dioxide to carbon monoxide remains substantially the same in all three instances. The rate of oxygen admission was 60 cubic meters per ton of steel produced. Depending on the magnitude of the charge required, the converter had a diameter ranging from 2 to 2.5 meters or approximately 6½ to 8½ feet.

I claim:

1. A process of refining a molten ferrous metal bath in a converter which is in association with a hood positioned above said converter, said hood being provided with a discharge outlet and wherein said converter, the top surface of said bath and said hood define a chamber, comprising the steps of top blowing the surface of said bath with a stream of free oxygen-containing gas and, simultaneously with said blowing, passing cool inert gas into said chamber in such a manner that said inert gas mixes with any other gas present in the chamber, continuing the passage of said inert gas into said chamber during said blowing operation to lower the temperature of the waste gases resulting from the refining reactions to below 1000° C., passing said cooled waste gases through said discharge outlet and cleaning said gases to recover carbon monoxide gas.

2. A process according to claim 1 wherein said inert gas is nitrogen.

3. A process according to claim 1 wherein said waste gases are cooled to a temperature below 800° C.

4. A process according to claim 1 wherein the rate of flow of the cool inert gas during the beginning portion of the refining operation is greater than the rate of flow during the intermediate portion.

5. A process according to claim 4 wherein the rate of flow of the cool inert gas during the end portion of the refining operation is greater than the rate of flow during the intermediate portion.

6. A process of refining a molten ferrous metal bath in a converter which is in air-tight association with a hood positioned above said converter, said hood being provided with a discharge outlet and wherein said converter, the top surface of said bath and said hood define a chamber, comprising the steps of top blowing the surface of said bath with a stream of free oxygen-containing gas through an oxygen tube and, simultaneously with said blowing, passing cool inert gas into said chamber at a point above the exit end of the oxygen tube in such a manner that said inert gas mixes with any other gas present in the chamber, continuing the passage of said inert gas into said chamber during said blowing operation to lower the temperature of the waste gases resulting from the refining reaction to below 1000° C., passing said cooled waste gases through said discharge outlet and cleaning said gases to recover carbon monoxide gas.

References Cited in the file of this patent

UNITED STATES PATENTS

| 1,742,750 | Bradley | Jan. 7, 1930 |
| 1,792,967 | Clark | Feb. 17, 1931 |
| 1,920,626 | Bragg | Aug. 1, 1933 |
| 1,928,509 | Sperr | Sept. 26, 1933 |
| 2,831,762 | Kemmetmuller et al. | Apr. 22, 1958 |
| 2,855,194 | Konig | Oct. 7, 1958 |
| 2,855,292 | Vogt | Oct. 7, 1958 |
| 2,862,701 | McFeaters | Dec. 2, 1958 |
| 2,902,358 | Kalling et al. | Sept. 1, 1959 |

FOREIGN PATENTS

| 772,632 | Great Britain | Apr. 17, 1957 |